(12) United States Patent
Kanter et al.

(10) Patent No.: US 7,552,366 B2
(45) Date of Patent: Jun. 23, 2009

(54) JITTER TOLERANCE TESTING APPARATUS, SYSTEMS, AND METHODS

(75) Inventors: Ofir Kanter, Haifa (IL); Eran Peleg, Akko (IL); Ehud Shoor, Nesher (IL); Eli Sterin, Nofit (IL)

(73) Assignee: Intel Corporation, Santa Clara, CA (US)

( * ) Notice: Subject to any disclaimer, the term of this patent is extended or adjusted under 35 U.S.C. 154(b) by 559 days.

(21) Appl. No.: 11/173,145

(22) Filed: Jun. 30, 2005

(65) Prior Publication Data
US 2007/0018703 A1  Jan. 25, 2007

(51) Int. Cl.
G06K 5/04 (2006.01)
G06F 11/00 (2006.01)

(52) U.S. Cl. ..................... 714/700; 714/704
(58) Field of Classification Search ........... 714/700, 714/704, 707, 744, 798, 799, 814, 815; 327/163; 375/226; 713/400, 500, 501, 502, 503, 600
See application file for complete search history.

(56) References Cited

U.S. PATENT DOCUMENTS

| | | | |
|---|---|---|---|
| 5,563,552 A * | 10/1996 | Gersbach et al. ............ 331/1 A |
| 5,657,253 A | 8/1997 | Dreyer et al. | |
| 5,663,991 A * | 9/1997 | Kelkar et al. ............... 375/376 |
| 5,852,630 A | 12/1998 | Langberg et al. | |
| 5,889,435 A * | 3/1999 | Smith et al. ................. 331/1 A |
| 6,115,763 A * | 9/2000 | Douskey et al. .............. 710/72 |
| 6,463,109 B1 * | 10/2002 | McCormack et al. ....... 375/355 |
| 6,564,347 B1 | 5/2003 | Mates | |
| 6,647,438 B1 | 11/2003 | Connor et al. | |
| 6,650,159 B2 | 11/2003 | Wang et al. | |
| 6,728,311 B1 * | 4/2004 | Waschura et al. .......... 375/224 |
| 6,747,490 B1 | 6/2004 | Jaussi et al. | |
| 6,774,686 B2 | 8/2004 | Kennedy et al. | |
| 6,995,554 B2 | 2/2006 | Loke et al. | |
| 7,325,175 B2 | 1/2008 | Momtaz | |

(Continued)

FOREIGN PATENT DOCUMENTS

DE 102004007648 B3 9/2005
WO WO-2007/005878 A1 1/2007

OTHER PUBLICATIONS

Baker, R. J., et al., "Figures From CMOS Circuit Design, Layout, and Simulation", *IEEE Press Series on Microelectric Systems*, Wiley Interscience, (1998), 11 pgs.
Xia, T., et al., "Time-to-Voltage Converter for On-Chip Jitter Measurement", *IEEE Transactions on Instrumentation and Measurement*, 52(6), (Dec. 2003), 1738-1748.

*Primary Examiner*—Phung M Chung
(74) *Attorney, Agent, or Firm*—Schwegman, Lundberg & Woessner, P.A.

(57) ABSTRACT

Apparatus, systems, methods, and articles may operate to move an output phase of a clock phase adjustment device associated with a master clock through a plurality of phase shifts relative to a phase of the master clock. A data integrity test may be performed on a serial data receive circuit clocked using an output phase of the clock phase adjustment device following each one of the plurality of phase shifts.

16 Claims, 4 Drawing Sheets

U.S. PATENT DOCUMENTS

| | | |
|---|---|---|
| 2001/0006343 A1 | 7/2001 | Yoshizawa |
| 2002/0053048 A1 | 5/2002 | Matsumoto et al. |
| 2003/0191592 A1 | 10/2003 | Mueller |
| 2005/0076279 A1 | 4/2005 | Cranford et al. |
| 2005/0193290 A1* | 9/2005 | Cho et al. .................. 714/710 |
| 2005/0193301 A1 | 9/2005 | Partovi et al. |
| 2005/0207522 A1 | 9/2005 | Lindner et al. |
| 2006/0290398 A1 | 12/2006 | Kanter et al. |
| 2006/0294442 A1 | 12/2006 | Kanter et al. |
| 2007/0002994 A1 | 1/2007 | Kanter et al. |

* cited by examiner

JITTER TOLERANCE TESTING APPARATUS, SYSTEMS, AND METHODS

TECHNICAL FIELD

Various embodiments described herein relate to communications generally, including apparatus, systems, and methods used to test clocked circuits for jitter tolerance.

BACKGROUND INFORMATION

Receive path performance in receiver-based devices (e.g., computer bus transceivers) may be tested during manufacturing to confirm receiver robustness. Robustness may include an ability to operate with an acceptable bit error rate under particular noise conditions for a period of time. Test time may be limited, however, such that all noise profiles may not be testable in the available test time. Simple tests producing short-term results that coordinate strongly with longer-term results may therefore afford a competitive advantage.

Traditional methods of testing the receiver-based devices may include placing transmitter/receiver pairs in loop-back and performing a data integrity test (used interchangeably hereinafter with bit-error rate test "BERT"). Since error margins may be small in some high-speed signaling systems, the traditional methods may produce inadequate pass/fail results. Quantitative methods displaying a finer granularity may be required, since a device that passes under a selected set of test conditions may fail under a different, untested set of conditions.

BRIEF DESCRIPTION OF THE DRAWINS

DETAILED DESCRIPTION

Figure 1:
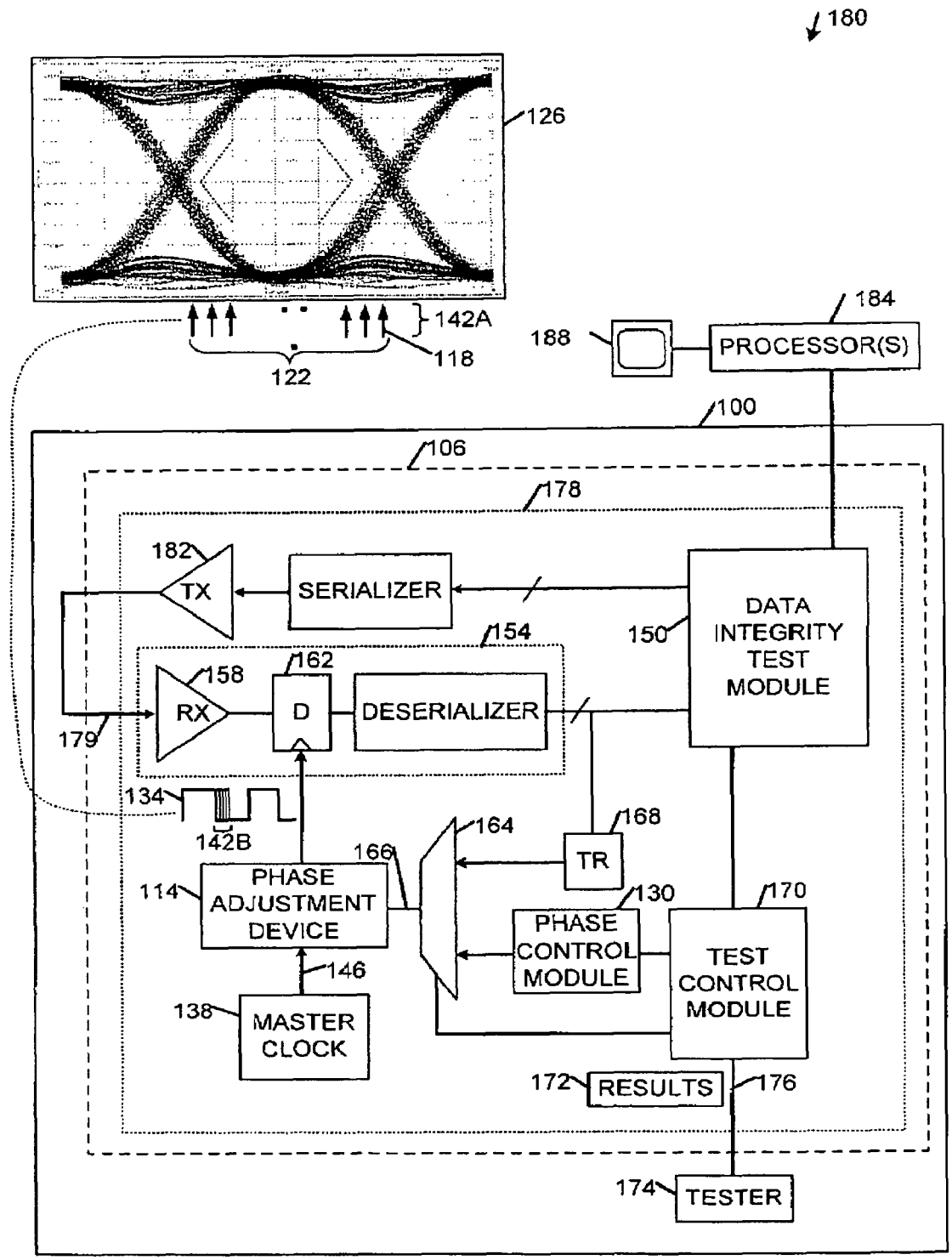
FIG. 1 is a block diagram of an apparatus and a representative system according to various embodiments of the invention.

FIG. 1 comprises a block diagram of an apparatus 100 and a system 180 according to various embodiments of the invention. Various embodiments of the invention disclosed herein may operate to test receiver robustness and jitter tolerance in a receiver-based device 106 clocked with a phase-adjustable clock. A test circuit may take control of a phase adjustment device 114 during production testing. The test circuit may move a clock phase 118 used to clock a BERT data stream into the receiver through a control range 122 of the phase adjustment device 114.

This operation is shown conceptually in oscilloscope "eye" pattern 126. It is noted that some embodiments described herein may not require an oscilloscope for automated production testing. A clock phase control loop may be controlled by a received timing recovery circuit during normal receiver operation. By breaking the loop, the clock phase may be prevented from drifting toward a center of the eye during testing. A width of the eye corresponding to receiver robustness may be tested by moving the clock phase in controllable increments and checking data integrity test results at each increment.

The apparatus 100 may thus comprise a phase control module 130 to adjust an output phase 134 of the clock phase adjustment device 114 associated with a master clock 138. The clock phase adjustment device 114 may comprise a phase interpolator (PT). The master clock may comprise a digital phase-locked loop (DPLL). The output phase 134 may be adjusted through a plurality of phase shifts 142A, 142B relative to a phase of a master clock input 146 to the clock phase adjustment device 114.

The apparatus 100 may also include a data integrity test module 150 to perform a data integrity test following each of the plurality of phase shifts 142A, 142B. The test may be performed on a serial data receive circuit 154 clocked using the clock phase adjustment device output phase 134. The serial data receive circuit 154 may comprise one or more receive driver(s) 158 coupled to an input clocking device 162.

The apparatus 100 may further include a selector 164 coupled to a clock phase adjustment device phase control input 166. The selector 164 may select between the phase control module 130 and a recovered timing module 168 to control the clock phase adjustment device 114. A test control module 170 may control one or more of the selector module 164, the phase control module 130, and the data integrity test module 150, and may report data integrity test results 172.

The apparatus 100 may also include a tester 174 coupled to the test control module 170 to perform production testing on the apparatus 100. In some embodiments, the tester 174 may comprise a joint test action group (JTAG) tester. A test interface 176 may communicate commands from the tester 174 to the test control module 170 and may communicate the data integrity test results 172 from the test control module 170 to the tester 174. Additional information regarding JTAG may be found in IEEE Standard 1149.1 Test Access Port and Bounclary-Scan Architecture (1990).

Some embodiments of the apparatus 100 may include a die 178 comprising (a) the receive driver(s) 158, (b) the master clock 138 coupled to the clock phase adjustment device 114, (c) the selector 164 coupled to the clock phase adjustment device 114, (d) the phase control module 130 coupled to the selector 164, (e) the test control module 170 coupled to the phase control module 130, and (f) the test interface 176 coupled to the test control module 170. The die 178 may also include the tester 174 coupled to the die 178 to perform the data integrity test. The tester 174 may perform the test while scanning the clocked data eye pattern 126 associated with a data integrity test data stream 179 received on the serial data receive circuit 154.

In another embodiment, a system 180 may include one or more of the apparatus 100 and all devices included therein as previously described. These devices and a serial data transmit circuit 182, among other elements, may be formed on a die 178 and may comprise a bus transceiver. The bus transceiver may comprise an example of a device under test in a semiconductor, device, apparatus, module, or system production environment.

The system 180 may further include one or more processor(s) 184 coupled to the data integrity test module 150 and a display 188 coupled to the processor(s) 184 to display a data integrity test result. The display 188 may comprise a cathode ray tube display or a solid-state display such as a liquid crystal display, a plasma display, or a light-emitting diode display, among other types.

Any of the components previously described can be implemented in a number of ways, including embodiments in software. Thus, the apparatus 100; receiver-based device 106; phase adjustment device 114; clock phase 118; phase adjustment control range 122; eye pattern 126; phase control module 130; output phase 134; master clock 138; phase shifts 142A, 142B; master clock input 146; data integrity test module 150; serial data receive circuit 154; receive driver(s) 158; input clocking device 162; selector 164; phase control input 166; recovered timing module 168; test control module 170; data integrity test results 172; tester 174; test interface 176; die 178; system 180; transmit circuit 182; processor(s) 184; and display 188 may all be characterized as "modules" herein.

The modules may include hardware circuitry, single or multi-processor circuits, memory circuits, software program modules and objects, firmware, and combinations thereof, as desired by the architect of the apparatus 100 and system 180 and as appropriate for particular implementations of various embodiments.

It should also be understood that the apparatus and systems of various embodiments can be used in applications other than testing semiconductor device receiver robustness by iterating a BERT test while changing a clock phase used to clock a received BERT data stream into the receiver. Thus, various embodiments of the invention are not to be so limited. The illustrations of apparatus 100 and system 180 are intended to provide a general understanding of the structure of various embodiments. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, audio players (e.g., mp3 players), vehicles, and others. Some embodiments may include a number of methods.

Figure 2:
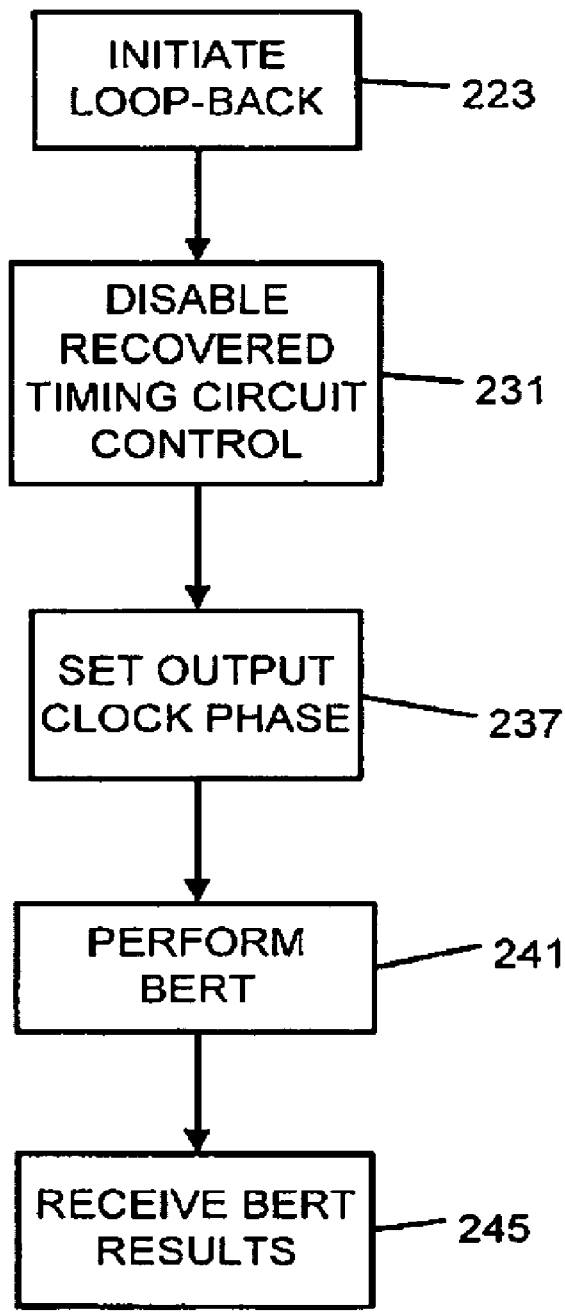
FIG. 2 is a flow diagram illustrating a method according to various embodiments of the invention.
Figure 3:
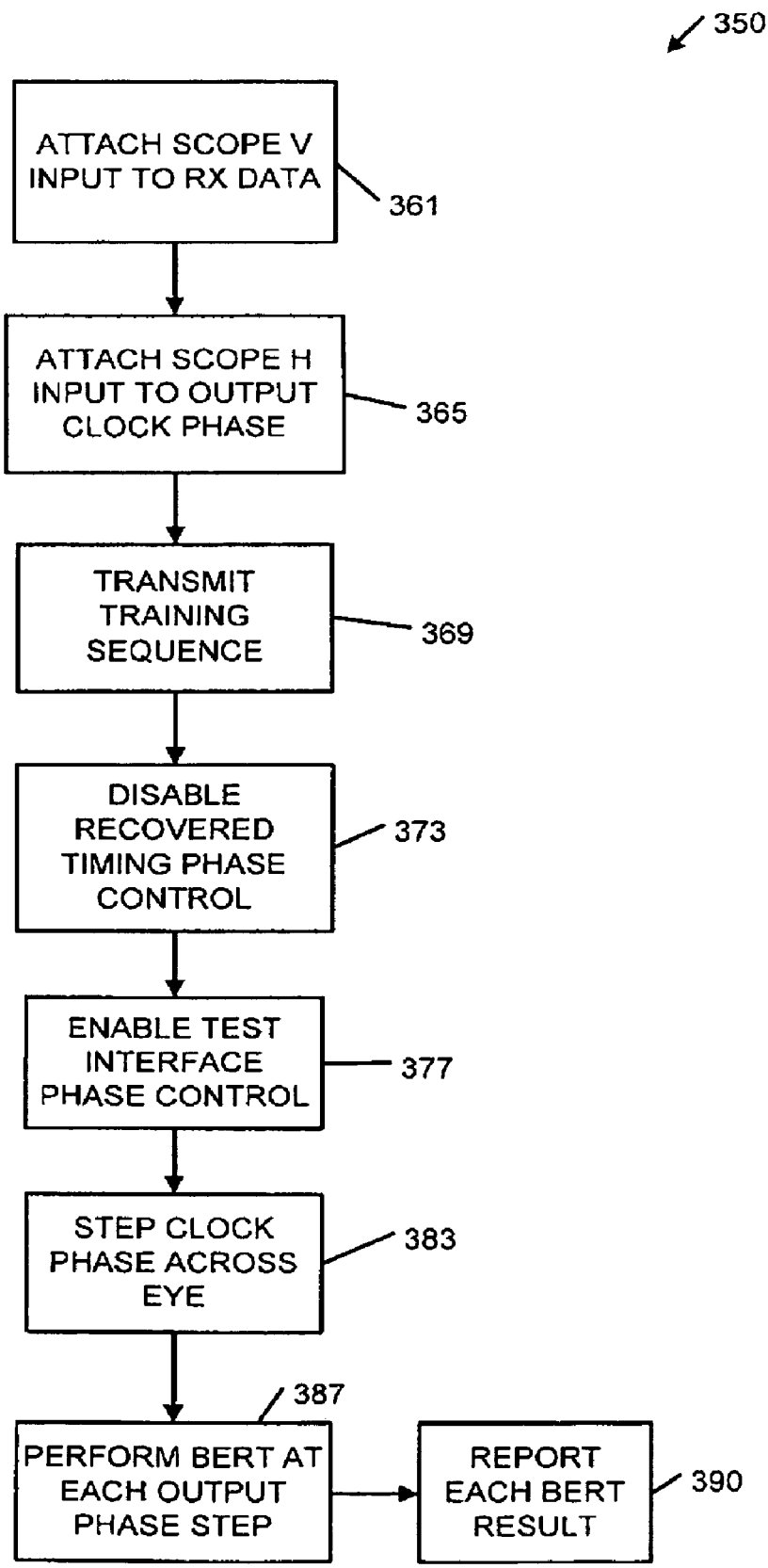
FIG. 3 is a flow diagram illustrating an alternate method according to various embodiments of the invention.

FIG. 2 and FIG. 3 are flow diagrams illustrating several methods according to various embodiments of the invention. Some elements described in the foregoing discussion of FIG. 2 and FIG. 3 may have been illustrated in FIG. 1 and described in the previous discussion of FIG. 1. A method 200 and an alternate method 350 are illustrated in FIG. 1 and FIG. 2 respectively. The alternate method 350 may use an oscilloscope, while the method 200 may not. These methods may include moving an output phase of a clock phase adjustment device associated with a master clock, perhaps in a device under test (DUT) in a production environment. The clock phase adjustment device may comprise a PI, and these terms may be used interchangeably hereinafter. The master clock may comprise a DPLL, and these terms may also be used interchangeably hereinafter.

The output phase may be moved through a plurality of phase shifts relative to a phase of the master clock. Moving the output phase may comprise stepping the output phase, including stepping the PI output phase through a PI adjustment range. Alternatively, the PI output phase may be moved to each PI adjustment position in a non-sequential order. "Stepping" referred to hereinafter comprises both methods. The methods 200 and 350 may also include performing a data integrity test following each one of the plurality of phase shifts. The data integrity test may comprise a BERT test, and may be performed on a serial data receive circuit clocked using an output phase of the clock phase adjustment device.

The method 200 may begin at block 223 with initiating a loop-back between a transmit element and a receive element in a transceiver comprising the serial data receive circuit. The method 200 may continue at block 231 with disabling a recovered timing control input to the PI prior to initiating the stepping operation. The method 200 may continue at block 237 with controlling the PI to set the output phase under test control. The method 200 may also include performing the BERT test, at block 241. The method 200 and iterations thereof may conclude at block 245 with receiving a result of the BERT at the test interface.

The phase stepping operation, the BERT, or both may be controlled from a test interface on a die comprising the DPLL, the PI, and the serial data receive circuit. The test interface may comprise a JTAG interface, among other types. The JTAG interface may conform to an Institute of Electrical and Electronics Engineers (IEEE) 1149.1-1990 standard.

The alternate method 350, illustrated in FIG. 3, may begin at block 361 with attaching a vertical input of an oscilloscope to an internal or external loop-back connection between a serial data transmit circuit and the serial data receive circuit, perhaps located in a DUT in a production environment. The transmit circuit and the receive circuit may be located on a die together with the master clock and the clock phase adjustment device. The method 350 may continue at block 365 with attaching a horizontal input of the oscilloscope to the output phase of the clock phase adjustment device to create a clocked input eye pattern display.

The method 350 may optionally include transmitting a training sequence on the loop-back connection to cause the output phase to move to a center of the clocked input eye pattern display, at block 369. The method 350 may continue at block 373 with disabling a recovered timing control input to the clock phase adjustment device, and at block 377 with enabling an external test interface control to the clock phase adjustment device, including perhaps a JTAG interface.

The method 350 may include stepping the phase output across the clocked input eye pattern display in phase change increments supported by the clock phase adjustment device, at block 383. The stepping operation may begin at any phase adjustment point and may continue sequentially or non-sequentially throughout the PI control range. The method 350 may further include performing the BERT at each output phase step, at block 387. The method 350 may conclude at block 390 with reporting the result of each BERT at the test interface.

It may be possible to execute the activities described herein in an order other than the order described. And, various activities described with respect to the methods identified herein can be executed in repetitive, serial, or parallel fashion. Information including parameters, commands, operands, and other data can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java, or C++, or the like. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 4 below.

Figure 4:
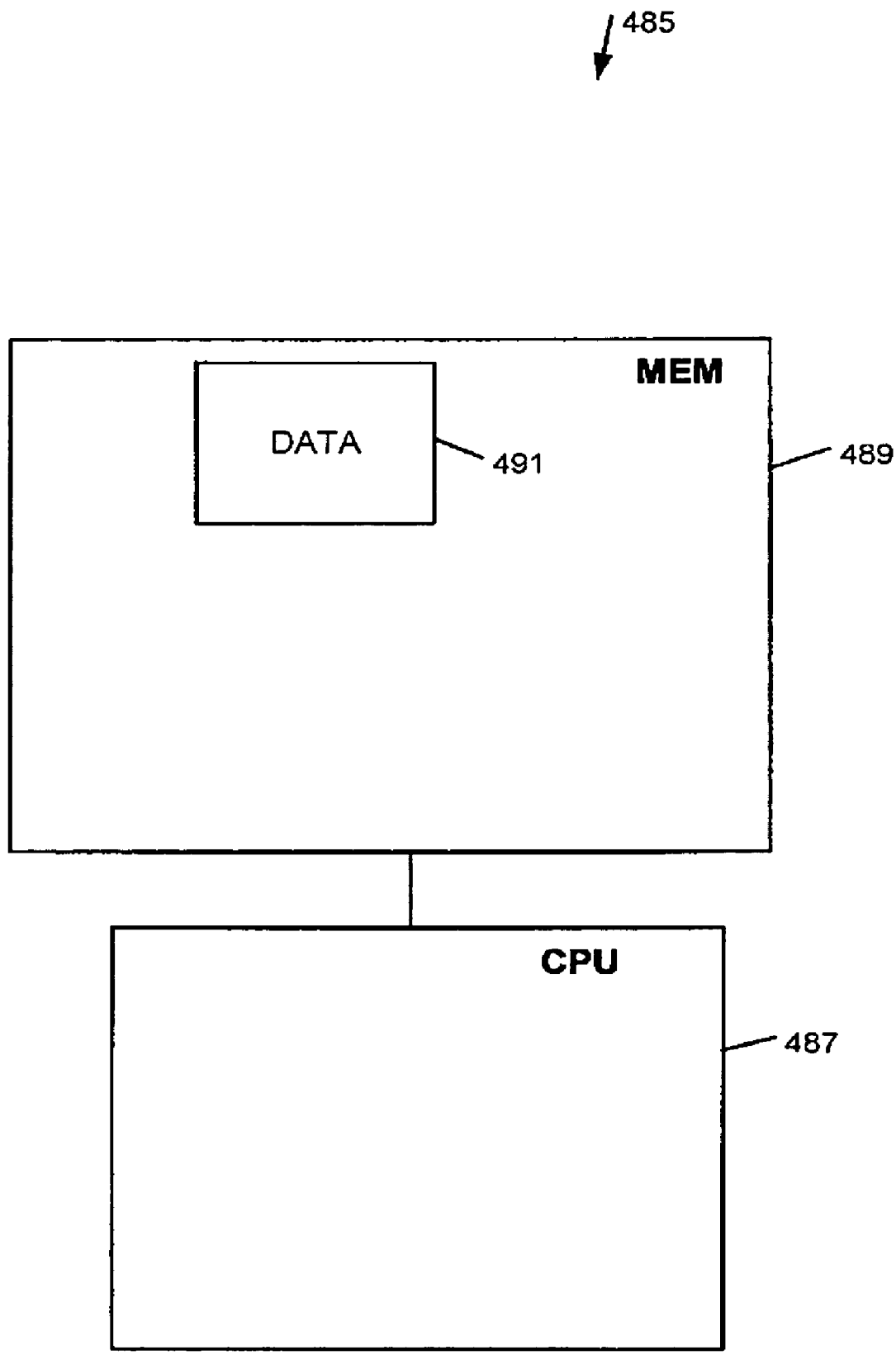
FIG. 4 is a block diagram of an article according to various embodiments of the invention.

FIG. 4 is a block diagram of an article 485 according to various embodiments of the invention. Examples of such embodiments may comprise a computer, a memory system, a magnetic or optical disk, some other storage device, or any type of electronic device or system. The article 485 may include one or more processor(s) 487 coupled to a machine-accessible medium such as a memory 489 (e.g., a memory including electrical, optical, or electromagnetic elements). The medium may contain associated information 491 (e.g., computer program instructions, data, or both) which, when accessed, results in a machine (e.g., the processor(s) 487) moving an output phase of a clock through a plurality of phase shifts and performing a data integrity test following each phase shift, as previously described. Other activities may include performing eye pattern tests, perhaps iteratively, using an oscilloscope or in automated form without the use of an oscilloscope.

Implementing the apparatus, systems, and methods disclosed herein may operate to test a receiver tolerance to phase jitter by performing a series of loop-back tests at various clocked phase margins.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which Such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method, including:
    moving an output phase of a clock phase adjustment device associated with a master clock through a plurality of phase shifts relative to a phase of the master clock; and
    performing a data integrity test following each one of the plurality of phase shifts on a serial data receive circuit clocked using the output phase of the clock phase adjustment device;
    attaching a vertical input of an oscilloscope to a loop-back connection between a serial data transmit circuit and the serial data receive circuit, wherein the serial data transmit circuit and the serial data receive circuit are located on a die with the master clock and the clock phase adjustment device; and
    attaching a horizontal input of the oscilloscope to the output phase of the clock phase adjustment device to create a clocked input eye pattern display.

2. The method of claim 1, wherein the master clock comprises digital phase-locked loop (DPLL).

3. The method of claim 1, wherein the clock phase adjustment device comprises a phase interpolator (PI).

4. The method of claim 1, wherein the data integrity test comprises a bit error rate test (BERT).

5. The method of claim 1, wherein moving the output phase comprises a stepping of the output phase.

6. The method of claim 5, further including:
    disabling a recovered timing control input to the clock phase adjustment device prior to initiating the stepping of the output phase.

7. The method of claim 1, further including:
    controlling at least one of a stepping operation or the data integrity test from a test interface on a die comprising the master clock, the clock phase adjustment device, and the serial data receive circuit.

8. The method of claim 7, wherein the test interface comprises a joint test action group (JTAG) interface.

9. The method of claim 8, wherein the JTAG interface conforms to an Institute of Electrical and Electronics Engineers 1149.1-1990 standard.

10. The method of claim 7, further including:
    receiving a result of the data integrity test at the test interface.

11. The method of claim 1, further including:
    initiating a loop-back between a transmit element and a receive element in a transceiver, wherein the transceiver includes the serial data receive circuit.

12. The method of claim 1, further including:
    stepping the output phase through an adjustment range associated with the clock phase adjustment device.

13. The method of claim 1 further including:
    moving the output phase in a non-sequential order using the clock phase adjustment device.

14. The method of claim 1, further including:
    disabling a recovered timing control input to the clock phase adjustment device;
    enabling a test interface control input to the clock phase adjustment device;
    stepping the phase output across the clocked input eye pattern display in phase change increments supported by the clock phase adjustment device;

performing the data integrity test at each output phase step; and reporting the result of each data integrity test at the test interface.

15. An article including a machine-accessible medium having associated information, wherein the information, when accessed, results in a machine performing:

moving an output phase of a clock phase adjustment device associated with a master clock through a plurality of phase shifts relative to a phase of the master clock;

performing a data integrity test following each one of the plurality of phase shifts on a serial data receive circuit clocked using the output phase of the clock phase adjustment device;

attaching a vertical input of an oscilloscope to a loop-back connection between a serial data transmit circuit and the serial data receive circuit, wherein the serial data transmit circuit and the serial data receive circuit are located on a die with the master clock and the clock phase adjustment device; and attaching a horizontal input of the oscilloscope to the output phase of the clock phase adjustment device to create a clocked input eye pattern display.

16. The article of claim 15, wherein the information, when accessed, results in a machine performing:

disabling a recovered timing control input to the clock phase adjustment device;

enabling a test interface control input to the clock phase adjustment device;

stepping the clock phase adjustment device phase output across the clocked input eye pattern display in phase change increments supported by the clock phase adjustment device;

performing the data integrity test at each clock phase adjustment device phase output step; and reporting the result of each data integrity test at the test interface.

* * * * *